(12) United States Patent
Palaniswamy et al.

(10) Patent No.: US 6,591,095 B1
(45) Date of Patent: Jul. 8, 2003

(54) METHOD AND APPARATUS FOR DESIGNATING ADMINISTRATIVE RESPONSIBILITIES IN A MOBILE COMMUNICATIONS DEVICE

(75) Inventors: Avinash C. Palaniswamy, Austin, TX (US); Robert L. Geiger, Sunnyvale, CA (US); James E. Van Peursem, Spring Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/574,773

(22) Filed: May 19, 2000

Related U.S. Application Data
(60) Provisional application No. 60/135,392, filed on May 21, 1999.

(51) Int. Cl.[7] .......................... H04M 1/66; H04M 1/68; H04M 3/16
(52) U.S. Cl. ...................... 455/411; 455/410; 455/424; 455/425; 713/200; 713/201
(58) Field of Search .................. 455/410, 411, 455/424, 425; 713/200–203

(56) References Cited

U.S. PATENT DOCUMENTS

| | | | | |
|---|---|---|---|---|
| 5,919,257 A | * | 7/1999 | Trostle | 713/200 |
| 6,148,405 A | * | 11/2000 | Liao et al. | 713/201 |
| 6,161,139 A | * | 12/2000 | Win et al. | 709/225 |
| 6,223,291 B1 | * | 4/2001 | Puhl et al. | 713/201 |
| 6,229,894 B1 | * | 5/2001 | Van Oorschot et al. | 380/21 |
| 6,385,651 B2 | * | 5/2002 | Dancs et al. | 709/227 |

* cited by examiner

*Primary Examiner*—Thanh Cong Le
*Assistant Examiner*—Tuan Tran
(74) *Attorney, Agent, or Firm*—Hisashi D. Watanabe

(57) ABSTRACT

A new process for determining the administrator of a mobile communications device, e.g., a wireless cellular telephone, two-way pager, or laptop computer, connectable to a telecommunications network. The system and methods described provide processes for determining whether a Subscriber Entity Module (SIM) is present with a digital certificate for a domain of an administrator, e.g., a network operator, for designating administrative responsibilities in a mobile communications device. A mechanism is provided to designate administrative privileges to an entity by the owner of the mobile communications device.

5 Claims, 3 Drawing Sheets

METHOD AND APPARATUS FOR DESIGNATING ADMINISTRATIVE RESPONSIBILITIES IN A MOBILE COMMUNICATIONS DEVICE

CROSS-REFERENCE TO RELATED APPLICATION

This application claims benefit of U.S. Provisional Application No. 60/135,392, filed May 21, 1999.

BACKGROUND OF THE INVENTION

The present invention relates to a mechanism to provide administrative privileges to an entity that is designated by the owner of a mobile communications device.

With numerous mobile communications devices being interconnected over a telecommunications network, a certificate approach for administrative verification may become advantageous rather than the conventional user name and password verification for network administration responsibilities. With mobile communications devices having become programmable with the adoption of third generation 3G digital cellular products, a differentiation may be established in the communications devices as between subsidized and owner controlled telephones which may be defined in accordance with the use of exchangeable Subscriber Identity Module (SIM) cards to establish the user privileges associated with the device based on owner and user status. Third party certificates may then be used to designate privileges for administrative responsibilities in the programming of the device. Accordingly, a new process is desired for determining the administrative privileges in mobile communications devices such as wireless cellular telephones, pagers, portable computers, and the like which are connectable to a telecommunications network.

Applications in the Trusted Third Party (TTP) domain are signed with a key that can be verified back to a trusted root certificate on a Mobile station application Execution Environment (MExE) device. The trusted root certificates may be managed (e.g., addition/deletion/mark trusted/mark untrusted/change fine grained access privileges) by an administrative entity that is designated by the owner of the device using a MExE administrator provisioning mechanism. It would be desirable to provide a mechanism to enable the owner of the device to dynamically assign administrator(s). Moreover, in the case of a remote administrator being the owner, a secure client-server mechanism would be desirable to manage the TTP domain. The owner of the mobile communications device could be the user, the operator, the service provider, and/or a third party. The mechanism should at least provide for the three (3) fundamental cases, i.e., the user is the owner; the owner is at a remote location, in which case the owner could be the operator, a service provider, or a third party; and the owner of the Universal Subscriber Identity Module (USIM) wants to be a temporary administrator.

The administrator of mobile communications devices may thus be determined by a logical provisioned mechanism which looks for an administrator root certificate stored on a mobile equipment (ME) entity. Accordingly, if the certificate is absent, then the user automatically becomes the administrator of the device. If an administrator root certificate is present, this certificate may be used for all remote administration authentication such that the owner of the administrator certificate becomes the administrator. The mechanism may be initiated after a power-up event is processed or when a USIM insert event is received. The power-up event is an abstract event that is caused when mobile communications device is cold started. The SIM-insert event is an event that is caused when the SIM is inserted into the device. The LeSIM modules used in the Global System for Mobile Communication (GSM) mobile cellular system are legacy GSM SIM cards. SIMs as discussed herein may correspond to a Universal Subscriber Identity Module (USIM) or any subscriber identity module that is not a legacy SIM, the current generation GSM subscriber identity module.

The administrator of the device is the entity who has the control of the third party trusted domain, and all resources associated with the domain. Domains comprise a group of entities who share a common root key for digital certificates and other security mechanisms. The administrator of the device could be the user, the operator, the service provider, or the third party as designated by the owner of the device. If the administrator is the user of the mobile communications device, then a method for designating administrative responsibilities may then check to see if there is a USIM. If a USIM is present, then the certificate can be checked. The format may be defined to allow the MExE device to determine whether the owner of the certificate wants to be a TTP certificate present (CP-TTP), certificate present but wants to be a temporary administrator (CP-Admin), or else certificate not present (CNP). If the certificate indicates a temporary administrator, the user may be queried to allow the certificate on the USIM to take temporary control of the trusted third party domain. If the certificate indicates a TTP, the user may be queried to allow or disallow the certificate as a trusted third party. However, if a certificate is not present on the USIM and the administrator is the user, or if the certificate is disallowed, then the user remains as the administrator.

Accordingly, a mechanism is desired for designating administrative responsibilities of a telecommunications network to provide administrative privileges to entities that may be designated and controlled by the owner of the mobile communications devices, which may be provided through the use of certificates identifying trusted parties in the designation of such administrative responsibilities.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF PREFERRED EMBODIMENTS

Figure 1:
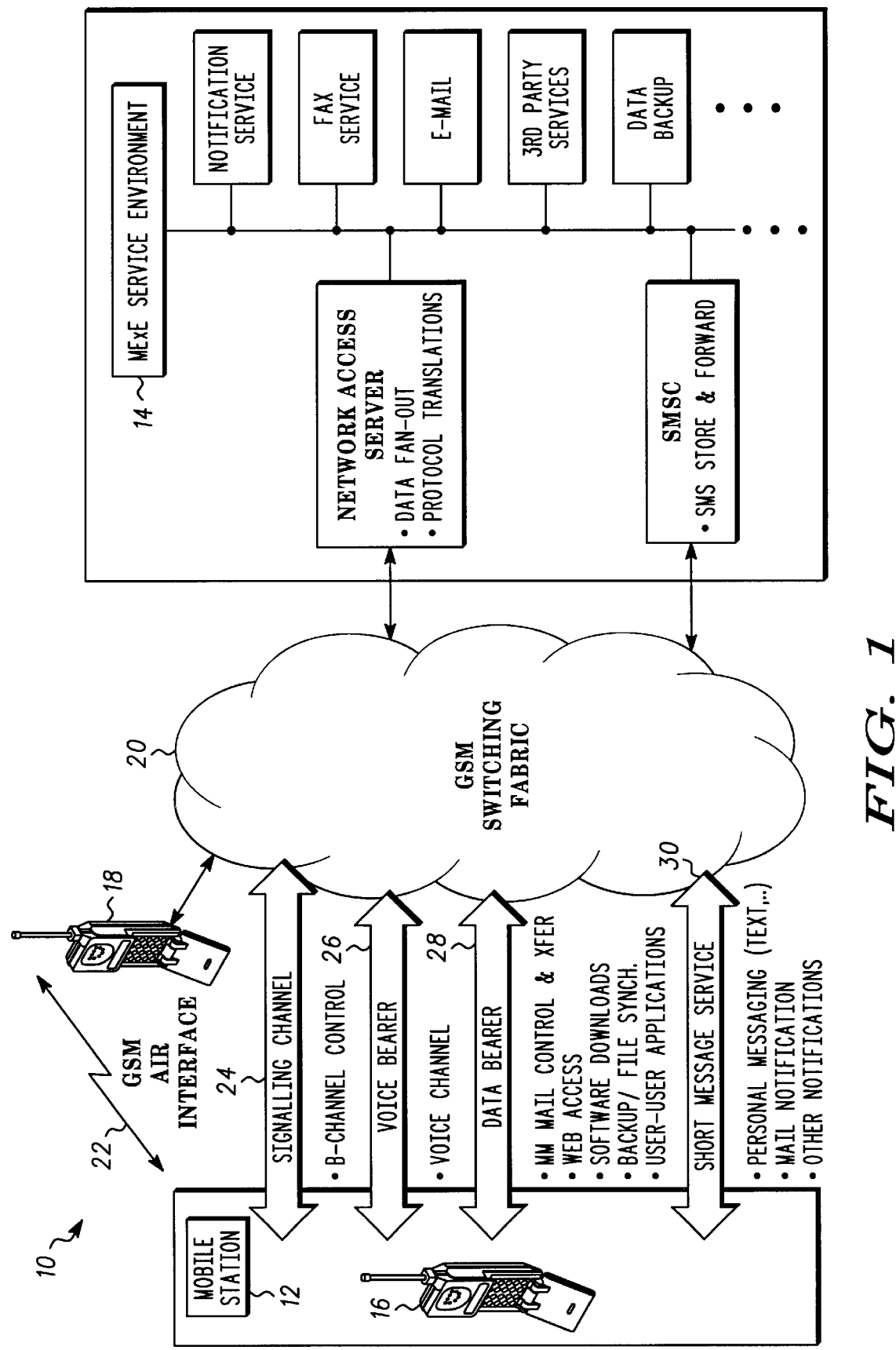
FIG. 1 illustrates an architecture for the mobile station application environment (MExE)

The architectural model shown in FIG. 1 shows an example of how a Global System for Mobile Communication (GSM) 10 network uses standardized transport mechanisms to transfer Mobile station application Execution Environment (MExE) services between the information processor of a Mobile Station (MS) 12 and the MExE service environment 14, or to support the interaction between two Mobile Equipment (ME) entities, MEs 16,18 executing a MExE service via a GSM switching fabric 20 for voice, data, and telecommunications services. The same architectural model can be applied in 3G networks as well.

A MExE certificate is a certificate used in the realization of MExE security domains. A MExE certificate can be used to verify downloaded MExE executables. Use of the word "certificate" in this document implies a MExE certificate. Other varieties of certificate will be explicitly qualified as, e.g., a "personal certificate". A MExE executable is an applet, application, or executable content, which conforms to the MExE specification and may execute on each ME 16,18.

The MExE service environment could, as shown in FIG. 1, consist of several service nodes each providing MExE services that can be transferred to the MS 12 using standard Internet protocols. The MExE service environment may also include a proxy server to translate content defined in standard Internet protocols into their wireless optimized derivatives.

For the versatile support of MExE services, the network 10 shall provide the MS 12 with access to a range of bearer services on the radio interface to support application control and transfer from the MExE service environment. The services include but are not limited to the GSM air interface 22, signaling channel control 24, voice bearer channel 26, data bearer channel 28, messaging services 30, and related applications.

All applications in the TTP domain have to be signed by a key which can be verified back to a trusted root certificate on the mobile communications device. The trusted root certificates can be managed (addition/deletion/mark trusted/mark untrusted/change fine grained access privileges) by an entity (administrator) that is designated by the owner of the device using known mechanisms (e.g., MExE administrative provisioning mechanism). A mechanism needs to be provided to enable the owner of the device to dynamically assign an administrator, and for the case of a remote administrator being the owner, a secure client-server mechanism to manage the TTP domain. The mechanism should provide for the following cases:

Case 1: The user is the owner;

Case 2: The owner is at a remote location. In this case the owner could be the operator, a service provider, or a third party; and Case 3: The owner of the SIM wants to be a temporary administrator.

Figure 2:
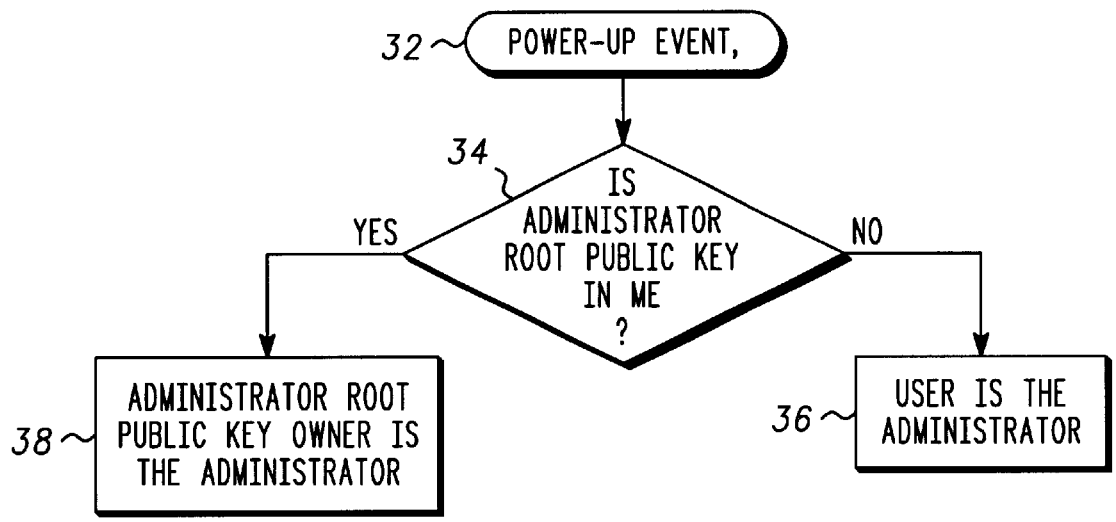
FIG. 2 is a flow diagram illustrating a preliminary process performed by a computer program loaded into program memory of a wireless communications device.
Figure 3:
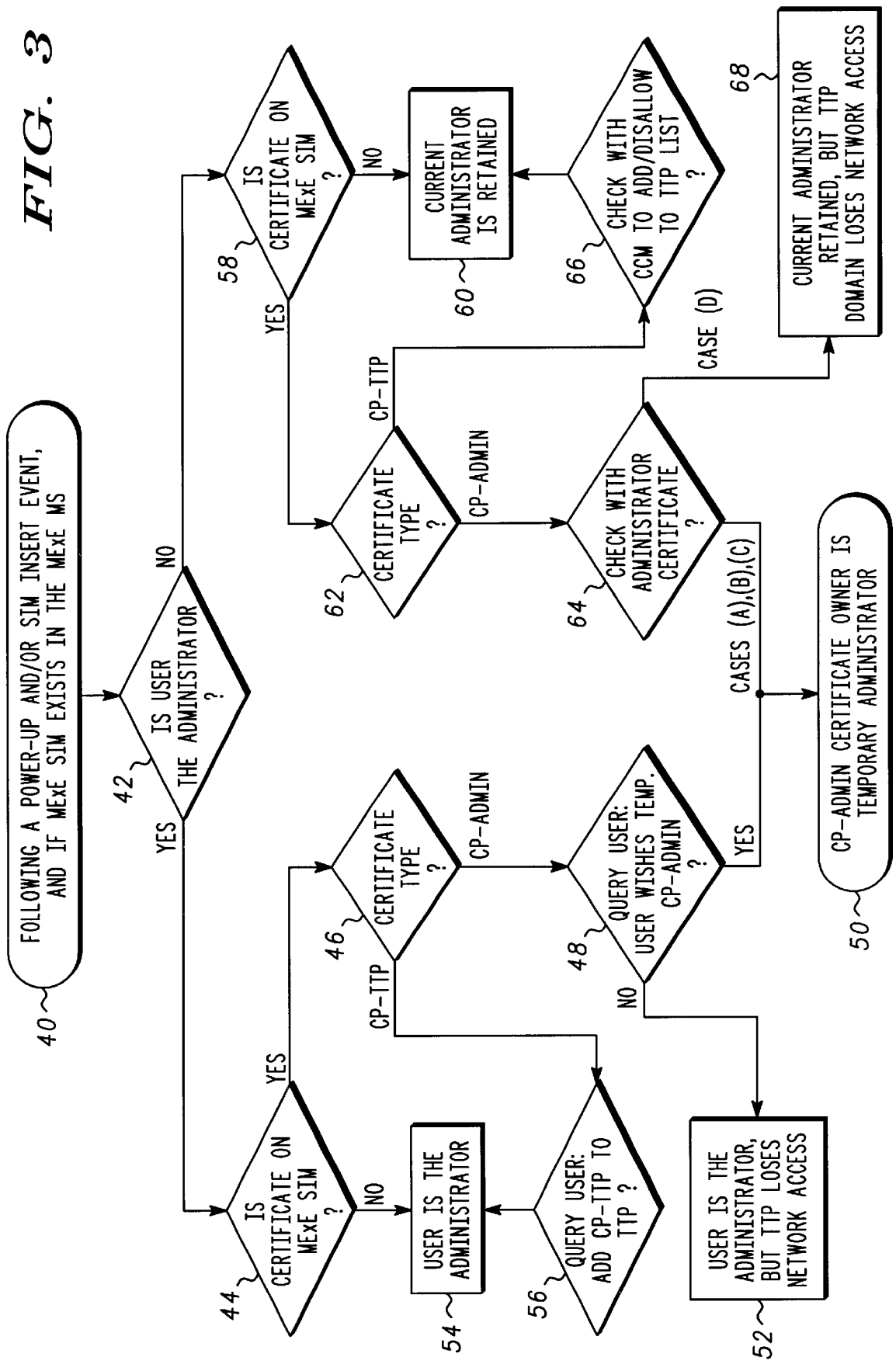
FIG. 3 is a continuation of the process illustrated in FIG. 2 showing how the provisioned mechanism looks for an administrator root certificate that is stored on the mobile communications device.

The administrator of the device is determined by the logical mechanism shown in the flow chart of FIGS. 2 and 3. As shown in FIG. 2, during power-up 32, the provisioned mechanism looks for an administrator root certificate that is stored on the mobile communications device. If the certificate is absent as determined through the administrator root public key in the ME 16,18 at step 34, then the user automatically becomes the administrator of the device at step 36. If an administrator root certificate is present, this certificate will be used for all remote administration authentication, implying that the owner of the administrator certificate is the administrator at step 38.

As discussed below in the process shown in FIG. 3, which is initiated after a power-up event 32 is processed or when a SIM-insert event is received 40, in order to manage the MExE and prevent attack from unfriendly sources, computer viruses, or transferred applications unintentionally damaging the MExE device, the described security system is employed. The following defines the MExE security architecture. The basis of MExE security is a framework of permissions which defines the permissions transferred MExE executables have within the MExE MS; the secure storage of these permissions; and conditions within the execution environment that ensure that MExE executables can only perform actions for which they have permission. The MExE permissions framework is as follows, with no implied hierarchy: MExE Security Operator Domain (MExE executables authorized by the HPLMN operator); MExE Security Manufacturer Domain (MExE executables authorized by the terminal manufacturer); MExE Security Third Party Domain (trusted MExE executables authorized by trusted third parties); support for the three domains is mandatory; and untrusted MExE executables are not in a specific domain and have very reduced privileges.

The permissions of operator, manufacturer, and third party security actions can only be performed by MExE executables via Application Programming Interfaces (APIs) which are intrinsically part of the MExE implementation. The security restrictions shall apply to MExE executables whether the API functionality is called directly or indirectly by the MExE executable. Explicit user permission is required for all actions by MExE executables in all domains. Untrusted MExE executables are not permitted access to any actions which access the telephone functionality.

Actions available using interfaces giving access to the telephone functionality can be categorized into a more restrictive group, then it shall not be again categorized into another, less restrictive group. For example, if a new action eventually results in forwarding a call, it shall be categorized into network access. If the action is totally new, it shall be categorized into some of the groups by comparing its functionality to the group description below and by comparing with the list of actions below.

1. Device core function access include functions which are an essential part of the telephone functionality.
2. SIM smart card low level access includes functions which allow communications at the transport service access point (send and receive application protocol data unit).
3. Network security access includes all functionalities which relate to CHV, CHV2, UNBLOCK CHV, and UNBLOCK CHV2 (verification, management, reading or modifying), GSM authentication, GSM ciphering.
4. Network property access includes functions which enable the management of operator-related data parameters and network settings.
5. Network services access includes all functionalities which result in or need interaction via the operator's network.
6. User private data access includes all functionalities which relate to management, reading or modifying of data that the user has stored in the MS, including user preferences.
7. MExE security functions access includes all functionalities which through an API relate to certificate handling in the MS, end to end encryption, signed content, hashing, access to public, private, secret keys stored in the MS or in a smart card.
8. Application access includes the functionalities which relate to launch provisioned functionality, MExE executables, external executables (SIM tool kit application, etc.) usage.

9. Lifecycle management includes the functionalities which are needed for installing or removing MExE executables in the MS.
10. Terminal data access includes the functions which relate to accessing terminal data, i.e., not user data.
11. Peripheral access includes the functionalities related to peripherals other than user interface peripherals usage through a high level software application interface.
12. Input output user interface access includes the functionalities related to the user interface and user notification means usage.

As shown in FIG. 3, if the administrator is the user (as determined by the process of FIG. 2), then a check is performed to see if there is a SIM. If a SIM is present at step 40, then a check is performed to see if there is a certificate. The format allows the mobile communications device to determine whether the owner of the certificate wants to do one of the following, namely:

1. Certificate present but just wants to be a TTP (shown in FIG. 3 by the abbreviation CP-TTP).
2. Certificate present but wants to be a temporary administrator (CP-Admin).
3. Certificate not present (CNP).

In order to enforce the MExE security framework, a MExE capable MS 12 is required to operate an authentication mechanism for verifying downloaded MExE executables. A successful authentication will result in the MExE executable being trusted; and able to be executed in a security domain (as determined by the root public key of its certification tree).

As the MExE MS 12 may want to authenticate content from many sources, a public key based solution is mandatory. Before trusting MExE executables, the MExE MS 12 will therefore check that the MExE executable was signed with a private key, for which the MExE MS 12 has the corresponding public key. The corresponding public key held in the MS 12 must either be a root public key (securely installed in the MS 12, e.g., at manufacture), or a signed public key provided in a certificate. The MExE MS 12 must be able to verify certificates, i.e., have the public key (as a root key or in a certificate) corresponding to the private key used to sign the certificate. Support of certificate claims is therefore mandatory.

A MExE MS 12 cannot verify certified MExE executables of a particular domain unless it has a root public key for that particular domain. Root public keys shall be securely installed in the MExE MS 12, say, at manufacture. It is recommended that a "disaster recovery" root public key be securely installed on the terminal, to be used to install new root public keys when all other root public keys on the terminal are invalid. Third party domain root public keys will typically be installed along with and integrated into the MExE ME 16,18 browser, as is done for PC-based browsers. A MExE executable can only be verified if the MExE MS 12 contains a valid root or certified public key corresponding to the private key used to sign the MExE executable. A MExE MS 12 shall support at least one level of certificate under operator, manufacturer, or third party root public keys. The MExE MS 12 shall support at least one level of certificate chain analysis in a signed content package. A certificate (other than one containing a root public key) shall only be considered valid if the signature on the certificate is verified by a valid public key (root or contained in a certificate) already present on the MS 12 and if the certificate being verified has not expired. Public keys shall not be shared between domains.

At step 42 the system determines whether the user is the administrator, and the presence of the certificate is checked out at step 44. If a certificate is present 46 and the certificate owner wants to be a temporary administrator 48, the user is queried at step 48 to allow the certificate on the SIM to take temporary control (step 50 discussed below) of the trusted third party domain. By temporary control, it is meant that once the card is removed, the administrator reverts back to the user administrator settings. The above mechanism implies that the configuration settings for the administrator at power-up needs to be saved, so that it can be restored. If the user disallows the SIM certificate, the TTP domain cannot use any of the network abilities in the trusted third party domain at step 52.

If the certificate is present and its owner just wants to be a TTP 54, the user is queried 56 to allow or disallow the certificate as a trusted third party. There are no ill-affects to the system by disallowing the certificate.

If a certificate is not present on the SIM as determined at step 58, and the administrator is the user 42, the user continues to be the administrator and can make use of all functionality at step 60.

If the administrator is not the user, then a check is performed to see if there is a SIM. If a SIM is present, then a check is performed to see if there is a certificate and the certificate type is determined at step 62. If a certificate is present, then the certificate on the SIM is checked with the administrator certificate 64 against the certificate on the mobile communications device for the following cases: (a) they are the same; (b) they are not the same, but the mobile communications device certificate is cross-certified with the SIM certificate (a cross-certificate exists on the mobile communications device); (c) they are not the same, but the mobile communications device certificate is under the SIM certificate domain; and (d) they are not the same.

If the owner of the certificate wants to be a temporary administrator (CP-Admin), then in the case of (a), (b), and (c), the temporary administrator is the owner of the CP-Admin certificate at step 50. In the case of (d), the TTP domain cannot use any of the network abilities in the trusted third party domain at step 68. If the certificate just wants to be a TTP, then the certificate (CP-TTP) is verified (step 62) with a certificate configuration message (CCM) and based on the content and permissions of the CCM, the certificate is added to the TTP list stored in the mobile communications device, or is rejected at step 66.

The manufacturer may load initial third party certificates on the device. Downloaded certificates shall be verified by an existed trusted certificate and placed in the domain defined by the root public key of the verification chain for the downloaded certificate.

The administrator root certificate shall be provided on the SIM if support for certificate storage on the SIM exists. For SIMs not having certificate storage, the administrator root may be downloaded using the root download procedure. The actions that may be performed for a given certificate are: addition; deletion; mark untrusted (untrusted certificates cannot be used to verify applications or other certificates. This process may be preferred to certificate deletion as there is a chance that the certificate may become trusted again in the near future.); mark trusted (marking as trusted is the process of allowing an untrusted certificate to come into use again); and modify fine grain access permissions (proposed as a future enhancement). The ability to perform these actions depend on the certificate type being modified, as well as the access level of the entity performing the operation. Users may add a third party certificate as long as it is certified by an existing trusted certificate. Using a provisioned functionality, users may delete third party certificates.

Figure 4:
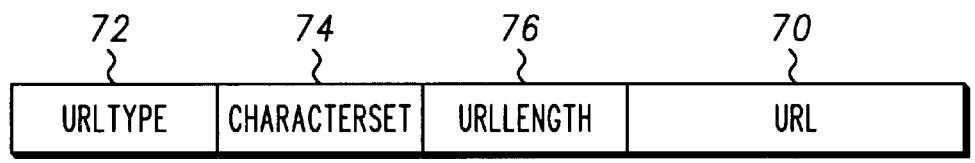
FIG. 4 is a message structure diagram illustrating URL information with the certificate illustrating the CCM message URL storage format.

Downloaded of trusted third party certificate lists by a remote administrator is done by using a secure mechanism as defined below. The download mechanisms preferably uses HTTP over Internet protocol (IP) and/or the wireless application protocol (WAP). The universal resource locator (URL) 70 from which the CCM is downloaded is either stored with the administrator certificate or in the administrator certificate. The format for storing the URL 70 information with the certificate is shown in FIG. 4, wherein:

Urltype=enumerated {WAP (0), HTTP (1)} (72).

CharacterSet=Internet assigned numbers authority assigned character set (74).

UrlLength=length of the URL in octets (76).

The download is initiated by (1) change in administrator, or (2) a provisioned application request for a CCM. All downloads are signed by a certificate in the administrator domain with administrator privileges, and hence are securely authenticated.

The mobile communications device has to support the administrator designation mechanism and the secure downloading of CCMs explained in the previous sections. The support can be in the form of a provisioned application, and/or a part of the mobile communications system.

The mechanism described works for three possible scenarios, namely (1) change of SIM; (2) roaming across networks; and (3) power-up.

The administrator of the MExE MS shall be determined by the logical process shown in the flow chart in FIG. 2, above. During power-up, the provisioned mechanism shall look for an administrator root public key that is stored on the ME. If the administrator root public key is absent, then the user shall automatically become the administrator of the MExE MS. If an administrator root public key is present, this root public key shall be used for all remote administration authentication, implying that the owner of the administrator root public key is the administrator. The rest of the mechanism is subsequently defined, however it is a future release implementation (see FIG. 3). This future enhanced administrator mechanism shall be initiated after a power-up event is processed or when a MExE-SIM is detected.

The following assumes that third party certificates can be added using the MExE-SIM, however third party certificates may be added using a non-SIM approach. If the administrator is the user, then a check shall be made to determine whether there is a MExE-SIM. If a MExE-SIM is present, then a check shall be made to determine whether there is a certificate in the MExE-SIM. The enhanced administrator mechanism shall allow the MExE MS to determine (via a format) what type of certificate is present. A certificate present in the MExE-SIM shall be considered by the ME as a third party certificate, whilst that MExE-SIM is inserted in the ME. The user shall be queried to allow or disallow the certificate as a third party. If a temporary certificate is present in the MExE-SIM, the user shall be queried whether to allow the certificate on the MExE-SIM to take temporary control of the third party domain. By temporary control it is meant that once the card is removed the administrator reverts back to the user administrator settings. The above mechanism implies that the previous configuration settings for the administrator shall be saved so that they may be restored. If the user disallows the MExE-SIM certificate, the third party domain shall not be able to use any of the network capabilities in the third party domain. If a certificate is not present on the MExE-SIM and the administrator is the user, the user shall continue to be the administrator and may make use of all functionality.

If the administrator is not the user, then a check is made to determine if there is a MExE-SIM. If a MExE-SIM is present, then a check is made to see if there is a certificate in the MExE-SIM. If a certificate is present in the MExE-SIM, then a comparison is made of the certificate's root public key on the MExE-SIM with the root public key on the ME for the following cases: (a) they are the same; (b) they are not the same, but the ME certificate is cross-certified with the MExE-SIM certificate (a cross-certificate exists on the ME); (c) they are not the same, but the ME certificate has a line of trust back to the MExE-SIM certificate domain; and (d) they are not the same. If the owner of the public key in the certificate on the MExE-SIM is to be a temporary administrator (CP-Admin), then in cases (a), (b), and (c), the temporary administrator shall be the owner of the CP-Admin root public key. In case (d), the third party domain shall not use any of the network capabilities in the third party domain. If the certificate is to be a third party, then the certificate (CP-TP) shall be verified with the CCM and, based on the content and permissions of the CCM, the certificate shall be added to the third party list or rejected.

Accordingly, a new process for determining the administrator of a mobile communications device (e.g., a wireless cellular telephone or a two-way pager or a laptop computer connectable to a network) has been described. The process determines whether a subscriber identity module is present. If it is present, and it has a digital certificate for a domain of an administrator (e.g., a network operator), a query is presented to the user of the device (e.g., via a display) inviting the user to authorize the certificate owner as the administrator (i.e., the highest level security access to the software and functions of the mobile device or the highest level access for software and functions in the designated domain). If the user agrees (by pressing an appropriate key or otherwise giving an input), the certificate owner becomes the temporary administrator (and any trusted third party domain preferably loses access). If the user does not agree, the user remains the administrator (and any trusted third party domain preferably loses access).

If the user is not the administrator, e.g., because there is an administrator digital certificate in the mobile communications device, and a SIM is present and the certificate on the SIM does not correspond to the certificate in the mobile device, then the current administrator (as defined by the certificate present in the device) is the administrator. Other scenarios are described above and illustrated in FIG. 3.

The format for storing the URL information 70 in the certificate shall be defined as part of the enhanced administrator mechanism. When the administrator is changed, then the CCM shall also be changed. If there is URL information with the certificate as described in FIG. 4, then the new CCM shall be obtained using the URL. If the administrator certificate was downloaded in a Java Archive File (JAR file), the CCM shall be obtained from the same JAR file.

The present invention extends to a mobile communications device having a process and a computer program programmed to carry out the described method. While the foregoing described embodiments have been set forth above, it will be appreciated to one skilled in the art that the inventions described have applications beyond the described embodiments. Accordingly, it is intended that the scope of the invention including such alternatives, modifications, and variations contemplated shall be defined by the appended claims.

What is claimed is:

1. A method for designating administrative responsibilities in a mobile communications device, the method comprising:

providing a communications network between a plurality of mobile stations;

transferring a definition of the mobile station operational environment between the plurality of mobile stations to support the interaction between two or more mobile stations;

verifying predetermined designations of administrative responsibilities associated with the mobile communications device in response to determining that an administrator root certificate is stored on the mobile communications device; and designating the administrative responsibilities associated with the mobile communications device to a user of the mobile communications device in response to determining that the administrator root certificate is absent from the mobile communications device.

2. The method as recited in claim 1, wherein said mobile communications device provides a user interface for configuration of mobile station application services.

3. The method as recited in claim 1, wherein said verifying step associates the administrator root certificate with criteria to designate levels of administrative privileges to an entity by an owner of the mobile communications device.

4. The method as recited in claim 1, wherein said verifying step associates the administrator root certificate with designated trusted third party entities.

5. The method as recited in claim 1, wherein said verifying step associates the administrator root certificate with a level of security associated with an entity for allowing or forbidding administrative actions associated with the mobile communications device.

* * * * *